(12) United States Patent
Jostes et al.

(10) Patent No.: US 11,199,059 B2
(45) Date of Patent: Dec. 14, 2021

(54) GROUND DRILLING DEVICE AND USE OF A GROUND DRILLING DEVICE

(71) Applicant: TRACTO-TECHNIK GmbH & Co. KG, Lennestadt (DE)

(72) Inventors: Lucas Jostes, Finnentrop (DE); Stefan Hermes, Lennestadt (DE)

(73) Assignee: TRACTO-TECHNIK GMBH & CO. KG, Lennestadt (DE)

( * ) Notice: Subject to any disclaimer, the term of this patent is extended or adjusted under 35 U.S.C. 154(b) by 0 days.

(21) Appl. No.: 16/784,940

(22) Filed: Feb. 7, 2020

(65) Prior Publication Data

US 2020/0300048 A1 Sep. 24, 2020

(30) Foreign Application Priority Data

Feb. 20, 2019 (DE) .................... 10 2019 001 200.3

(51) Int. Cl.
*E21B 19/083* (2006.01)
*E21B 7/04* (2006.01)
*F16H 19/04* (2006.01)

(52) U.S. Cl.
CPC ............ *E21B 19/083* (2013.01); *E21B 7/046* (2013.01); *F16H 19/04* (2013.01)

(58) Field of Classification Search
CPC ............................... E21B 19/083; E21B 7/046
See application file for complete search history.

(56) References Cited

U.S. PATENT DOCUMENTS

| | | | |
|---|---|---|---|
| 1,036,584 A | 8/1912 | Dixon | |
| 4,670,928 A * | 6/1987 | Alten ................. | B65G 69/2852 14/71.3 |
| 2014/0033842 A1* | 2/2014 | Morin .................. | F16H 37/041 74/89.17 |
| 2016/0160585 A1* | 6/2016 | Fischer .................... | E21B 6/02 175/57 |
| 2016/0251914 A1* | 9/2016 | Pusheck ................ | E21B 19/083 166/77.1 |

FOREIGN PATENT DOCUMENTS

| | | |
|---|---|---|
| DE | 10 2014 018 100 B3 | 5/2016 |
| EP | 0 886 034 B1 | 12/1998 |
| WO | 2010130357 A2 | 11/2010 |

* cited by examiner

*Primary Examiner* — Giovanna Wright
(74) *Attorney, Agent, or Firm* — Howard IP Law Group

(57) ABSTRACT

A Ground drilling device having a drilling carriage and a sled movable back and forth on the drilling carriage, wherein at least one gear is present for the drive of the sled, whose rotary movement is transformed into a linear movement by means of a rack, wherein a force relieving pathway is provided to relieve the gear of a radially introduced force.

16 Claims, 1 Drawing Sheet

GROUND DRILLING DEVICE AND USE OF A GROUND DRILLING DEVICE

FIELD OF INVENTION

The invention relates to a ground drilling device and a use of a drill string.

BACKGROUND

Ground drilling devices, particularly horizontal drilling devices, are used to introduce earth boreholes into the soil in trenchless methods, for example for supply and disposal conduits, or to replace old lines already laid in a trenchless method. To make the earth borehole, a drill string comprising drill rod sections is usually employed, in which the drill rod sections can be connected to each other.

For example, it is known from EP 0 886 034 B1 how to use a sled moving back and forth in a frame in order to push and/or pull a drill string. The sled comprises a holder for a drill rod section, so that the drill rod section can be moved in the holder in the direction of an axis of advancement to create the earth borehole. The drive unit acting on the drill rod section can act on the drill rod section in the holder in rotary and/or translatory manner.

For the translatory driving of the sled in the frame, it is known how to employ multiple hydraulic motors for large and powerful ground drilling devices, which are used for the driving of the sled in the frame, i.e., for its movement back and forth. Each of the hydraulic motors can have a planetary gearing, comprising a feeding pinion, engaging with a rack firmly situated in the frame and moving the sled in the frame, particularly in translatory movement. It is thus known how to use more than one motor for example to carry out the ground drilling in firm soil for large and powerful ground drilling devices.

From DE 10 2014 018 100 B3 there is provided a rotary drive for the driving of a sled of a ground drilling device, which directly or indirectly drives a pinion that can be brought into engagement with a rack. The rotary drive stands in engagement with a further pinion, which can be brought into engagement with the rack. The very same rotary drive directly or indirectly drives the pinion, which can be brought into engagement with the rack, as well as the further pinion. Both pinions are driven directly or indirectly by the very same rotary drive.

Although the known ground drilling devices are simple in design and good results can be accomplished with the ground drilling devices in regard to such ground drilling, it has been discovered that heavy wear is possible on the rack or pinion. This may decrease the service life of the ground drilling device and/or decrease the servicing intervals and/or require a further adjustment of the tooth tip clearance.

SUMMARY

The problem which the invention proposes to solve is therefore to improve a ground drilling device having a drive comprising a rack and pinion in regard to its service life and to increase the servicing intervals.

The key idea of the invention is to provide a force relieving pathway to relieve the gear of a radially introduced or generated force. In this way, the gear can be braced and a radial force generated by the gears can be diverted. Moreover, thanks to the bracing, a tooth tip clearance can basically be defined or set in predetermined manner. The distance between the gear and the rack or a further gear interposed between the gear and the rack can be adjusted. A direct introducing of the radial force emanating from the gear can thus be diverted along the force relieving pathway. Service life of gear, rack, and/or possibly further interposed gears is increased. In particular, a force relieving pathway is formed for at least one gear meshing (directly) with the rack. The bearings of the gears or gear can be subjected to less strain, so that the bearings can have a more favorable design.

The invention creates a ground drilling device having a drilling carriage and a sled movable back and forth on the drilling carriage, wherein at least one gear is present for the drive of the sled. The rotary movement of the gear can be transformed into a linear movement by means of a rack. A force relieving pathway is provided to relieve the gear of a radially introduced force.

The term "ground drilling device" encompasses in the sense of the specification any device which moves in particular a drill string having rod sections in an existing or yet to be created conduit in the soil, in order to create or widen a borehole, particularly a horizontal borehole (HD), or to draw pipelines or other long bodies into the soil. In particular, the ground drilling device may be a HD device. A ground drilling device in the sense of the specification comprises a device driving a drill string, working by displacement of soil, and introducing the drill string into the soil by rotatory and/or translatory movement in the longitudinal axial direction of the drill string. The introducing of the drill string by translatory movement in the longitudinal axial direction may be by pushing or pulling.

The term "horizontal borehole" (HD, horizontal drilling) in the sense of the present specification encompasses in particular every kind of existing or yet to be created conduit in a body, preferably running horizontally for at least a portion, particularly soil conduits including soil boreholes, rock boreholes or ground channels, as well as underground or aboveground pipelines and water channels that can be produced or pulled in by use of a corresponding ground drilling device.

The term "drilling carriage" encompasses a frame, particularly a movable frame, on which a sled can be provided for moving the drill string, which can move back and forth in the direction of the drill string axis in order to move the drill string in the soil by pushing or pulling. The sled may be moved relative to the drilling carriage by the use of a linear drive, wherein a rack and pinion are part of the linear drive. Moreover, the drilling carriage can comprise one or more clamping devices, by which the drill string or a rod section being attached can be secured. It may be provided that a clamping device is provided on the drilling carriage, by means of which the free end of the drill string, i.e., the end protruding out from the ground, can be secured, in order to make possible a connecting of a newly attached rod section to the already introduced drill string.

A holder can be provided on the sled, which can receive a rod section being added or removed, particularly at the end, in such a way that the holder secures the rod section with force locking and/or form fitting, in order to drive the rod section in particular by turning about its longitudinal axis. The holder can be designed, for example, such that the holder engages at its end with a rod section being added or removed and creates a form fitting. When the holder is turned, the rod section taken up by the holder can also be turned possibly after the holder has been screwed together with the rod section. The sled may lie on the drilling carriage or a base connected to the drilling carriage. The drilling carriage and/or the base can be profiled and the spacing elements may be designed as rollers. Runners are also possible as spacing elements. The sled may be suspended from or be set down on the drilling carriage. The sled may comprise or encompass further components, and the sled can be moved along a path, particularly a purely translatory path, to the drilling carriage.

The gear can be arranged directly on the shaft of a rotary drive, so that the gear is driven directly by the rotary drive. The gear may mesh directly or indirectly with the rack. However, it may also be provided, as specified in DE 10 2014 018 100 B3, that a driving pinion is present, which meshes with two gears, which in turn mesh with the rack. Two gears are employed, arranged symmetrically to the driving pinion, and the driving pinion is offset from the rack, not meshing with it. Accordingly, in regard to the drive, reference can be made in full to DE 10 2014 018 100 B3. Insofar as a driving pinion is present having two gears meshing with the rack, a force relieving pathway can be provided for each of the gears.

The term "force relieving pathway" in the sense of the specification encompasses a pathway of elements making contact or standing in force closure with each other, by which a relieving of the force emanating from the gear or introduced into the gear can occur. A relieving in the sense of the specification is provided in addition to the drive shaft or output shaft of the rotary drive, which likewise necessarily absorbs forces. The force relieving pathway is formed in particular at a distance from a section of the output shaft situated between the rotary drive and the gear.

In one preferred embodiment, a section of the force relieving pathway is formed by means of a support element connected to the gear. A radial force from the gear may be diverted by the support element and the gear can also be braced. The tooth tip clearance can be adjusted by acting on the support element, dictating the spacing between gear and rack by means of the support element.

In one preferred embodiment, a bracing element extends along the rack, being offset from it, and is adapted to brace the support element during the movement of the sled. The bracing element can act on the support element and absorb the radial force introduced by the gear. The bracing element in particular can be arranged on the drilling carriage and form the region of the force relieving pathway in which the radial force is diverted. Thus, the bracing element in particular connected rigidly to the drilling carriage can form an end of the force relieving pathway.

In one preferred embodiment, the support element is arranged coaxial to the gear, particularly at a spacing from the drive for the gear. In this way, the gear can be braced at a point which is effective and the gear can be acted upon accordingly. Easy access is possible. The support element can be provided on the drive shaft or the output shaft for the gear.

In one preferred embodiment, the support element is designed to rotate with the gear, which results in a simple configuration and a simple design of the ground drilling device. In one preferred embodiment, the support element can be designed movable relative to the gear with a bearing interposed between them. It is thus possible that the support element itself does not need to rotate with the gear. The support element can remain at rest and the force can be diverted from the support element via the bearing, in particular to a possibly provided bracing element.

In one preferred embodiment, the support element is a pressure roller, which significantly simplifies the configuration. The circumference of the support element is preferably round, particularly circular.

In one preferred embodiment, a driving pinion can mesh directly with the rack or at least one further gear is provided, standing in meshing engagement with the driving pinion and the rack, wherein configurations are possible as are disclosed in DE 10 2014 018 100 B3.

The invention also creates a use of a ground drilling device, wherein a ground drilling device is used, having a drilling carriage and a sled movable back and forth on the drilling carriage, wherein at least one gear is used for the drive of the sled, whose rotary movement is transformed into a linear movement by means of a rack. A force relieving pathway is used to relieve the gear of a radially introduced force.

The invention is being described in regard to two aspects, relating to a ground drilling device and a use of ground drilling device. The remarks on the individual aspects complement each other, so that the remarks for the ground drilling device are also to be understood as remarks describing the use and vice versa. With the description of the ground drilling device, features in regard to the use are also disclosed, and vice versa.

The preceding remarks, just as the following description of exemplary embodiments, do not constitute any abandonment of particular embodiments or features.

BRIEF DESCRIPTION OF THE DRAWINGS

The invention shall now be explained more closely with the aid of an exemplary embodiment presented in the drawing.

The drawings show.

DETAILED DESCRIPTION

Figure 1:
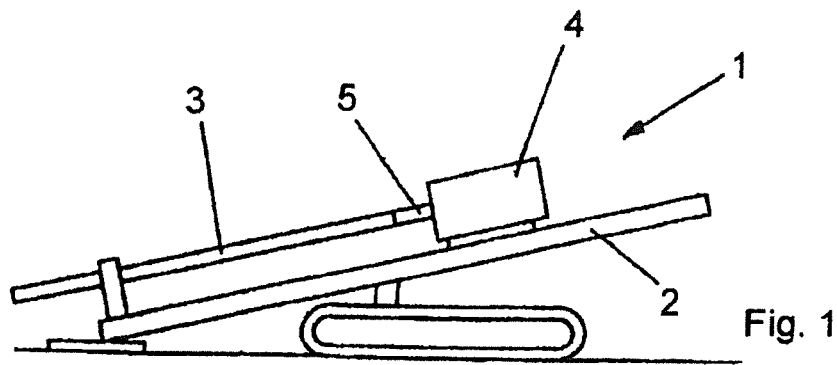
FIG. 1 is a side view of a ground drilling device in schematic representation.

FIG. 1 shows a ground drilling device 1. The ground drilling device 1 comprises a drilling carriage, which serves as a guide for a sled 4. The sled 4 is designed to apply pushing or pulling forces and/or torque/rotary speed to a drill string 3 by means of a holder 5, which is designed as an adapter for a rod section or the drill string.

Figure 2:
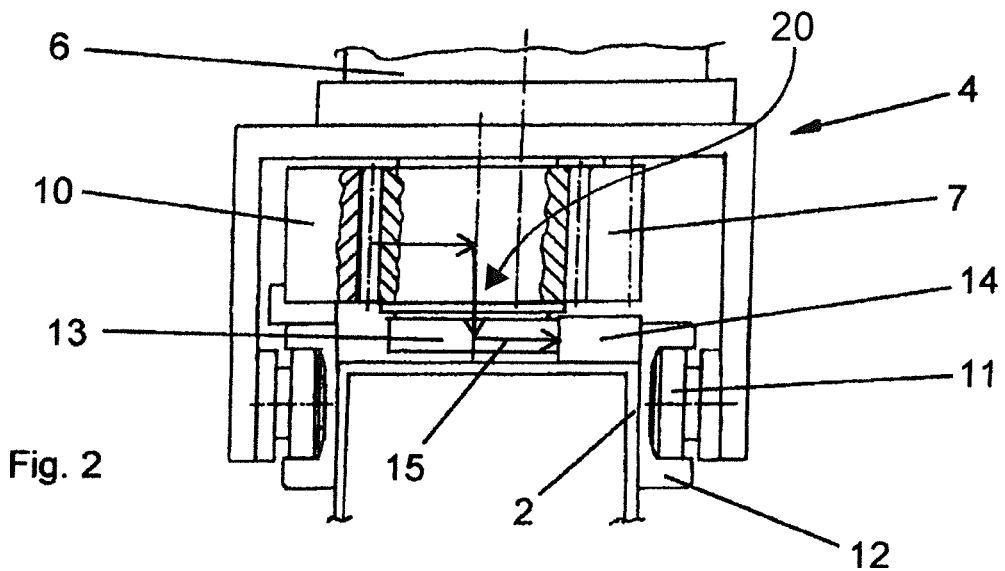
FIG. 2 is a cutout from a view of the ground drilling device in the direction of the drill string axis.

FIG. 2 shows a cutout of the ground drilling device 1 represented in FIG. 1 in a detail view, showing the drilling carriage 2 with part of the drive and guide elements. The sled 4 comprises a rotary drive 6 consisting of a hydraulic motor with a gearing. The rotary drive 6 drives an output shaft, on which a gear 7 is mounted in the form of a driving pinion, which in turn drives two further gears 8, 9, respectively engaging with a rack 10 arranged on the drilling carriage 2. The rotation of the gear 7 and that of the further gears 8, 9 is transformed into a linear movement of the sled 4.

The sled 4 is guided by running rollers 11, which roll along guide rails 12 on the drilling carriage 2, for the linear movement.

Figure 3:
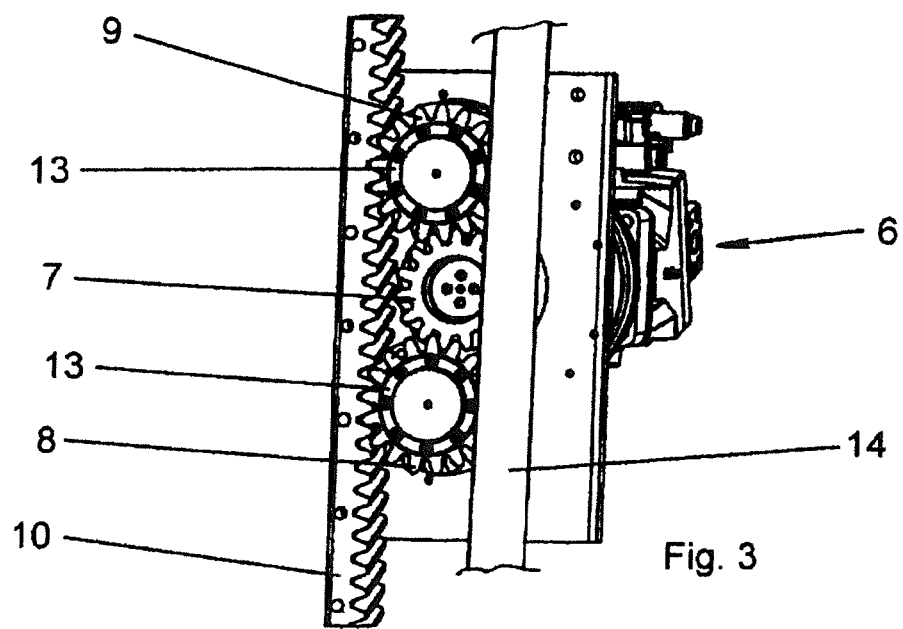
FIG. 3 is a view of the drive of the ground drilling device from below, not showing parts of the drilling carriage in order to show the gear and rack.

As can be seen from FIG. 3, support elements 13 designed as pressure rollers are mounted on the additional gears 8, 9, coaxial with them. The support elements 13 are designed so that they can roll along a bracing element 14 configured as a running rail. The radial forces occurring on the bearings of the additional gears 8, 9 and on the bearings of the rotary drive 6 due to the engaging of the additional gears 8, 9 with the rack 10 can be diverted along a force relieving pathway 20 represented by arrows 15.

The invention claimed is:

1. A ground drilling device comprising:
a drilling carriage and a sled movable back and forth on the drilling carriage, wherein at least one gear is present for a drive of the sled; whose rotary movement is transformed into a linear movement by means of a rack, and
a force relieving pathway comprising a support element connected to the at least one gear to relieve the at least one gear of a radially introduced force, and a bracing element to brace the support element during the movement of the sled, wherein the bracing element and the rack are independently arranged on the drilling carriage.

2. The ground drilling device according to claim 1, wherein the support element is arranged coaxial to the at least one gear at a spacing from the drive for the gear.

3. The ground drilling device according to claim 1, wherein the support element is adapted to rotate with the at least one gear.

4. The ground drilling device according to claim 1, wherein the support element is movable relative to the at least one gear with a bearing interposed between the support element and the at least one gear.

5. The ground drilling device according to claim 1, wherein the support element is a pressure roller.

6. The ground drilling device according to claim 1, wherein the at least one gear meshes directly with the rack or at least one further gear is provided, standing in meshing engagement with the at least one gear and the rack.

7. The ground drilling device according to claim 1, wherein the bracing element is arranged on an opposite side of the at least one gear from the rack.

8. The ground drilling device according to claim 1, wherein a radius of the support wheel is smaller than the radius of the at least one gear.

9. A method comprising: driving a sled movable back and forth on a drilling carriage of a ground drilling device using at least one gear, whose rotary movement is transformed into a linear movement by means of a rack, and providing a force relieving pathway to relieve the gear of a radially introduced force by providing a support element connected to the at least one gear to relieve the at least one gear of a radially introduced force and providing a bracing element arranged independently from the rack on the drilling carriage to brace the support element during the movement of the sled.

10. The method of claim 9, wherein providing the support element connected to the at least one gear comprises providing the support element connected coaxially to the at least one gear at a spacing from a drive for the at least one gear.

11. The method of claim 9, further comprising adapting the support element to rotate with the gear.

12. The method of claim 9, wherein providing the force relieving pathway further comprises providing a bearing interposed between the support element and the at least one gear so that the support element is movable relative to the gear.

13. The method of claim 9, wherein providing the support element connected to the at least one gear comprises providing a pressure roller connected to the at least one gear.

14. The method of claim 9, wherein the at least one gear meshes directly with the rack or at least one further gear is provided, standing in meshing engagement with the at least one gear and the rack.

15. The method of claim 9, further comprising arranging the bracing element on an opposite side of the at least one gear from the rack.

16. The method of claim 9, wherein a radius of the support wheel is smaller than the radius of the at least one gear.

* * * * *